United States Patent
Roberts et al.

(10) Patent No.: US 7,112,015 B2
(45) Date of Patent: Sep. 26, 2006

(54) DRILL TOOL

(75) Inventors: Philip Roberts, Broughton (GB); David Sprake, Broughton (GB)

(73) Assignee: Airbus UK Limited, Bristol (GB)

( * ) Notice: Subject to any disclaimer, the term of this patent is extended or adjusted under 35 U.S.C. 154(b) by 151 days.

(21) Appl. No.: 10/489,172

(22) PCT Filed: Jul. 18, 2002

(86) PCT No.: PCT/GB02/03281

§ 371 (c)(1),
(2), (4) Date: Mar. 10, 2004

(87) PCT Pub. No.: WO03/026822

PCT Pub. Date: Apr. 3, 2003

(65) Prior Publication Data

US 2004/0240951 A1 Dec. 2, 2004

(30) Foreign Application Priority Data

Sep. 26, 2001 (GB) .................... 0123112.5

(51) Int. Cl.
*B23B 47/06* (2006.01)
(52) U.S. Cl. .................. 408/97; 408/112
(58) Field of Classification Search ............. 408/110, 408/112, 127, 97, 115 R, 124
See application file for complete search history.

(56) References Cited

U.S. PATENT DOCUMENTS

| | | | | |
|---|---|---|---|---|
| 2,333,025 A | * | 10/1943 | Mayer | ............ 464/115 |
| 2,487,203 A | | 11/1949 | Wilber | |
| 2,636,404 A | * | 4/1953 | Davis | ............ 408/97 |
| 2,711,199 A | * | 6/1955 | Salsberg | ............ 144/104 |
| 2,747,384 A | | 5/1956 | Beam | |
| 2,958,349 A | | 11/1960 | McNutt | |
| 3,006,223 A | * | 10/1961 | Broussard | ............ 408/85 |
| 3,016,073 A | * | 1/1962 | Broussard et al. | ............ 408/85 |
| 3,977,805 A | * | 8/1976 | Wanous | ............ 408/115 B |
| 4,184,795 A | | 1/1980 | Medlin | |
| 4,999,896 A | * | 3/1991 | Mangus et al. | ............ 29/34 B |
| 5,743,683 A | * | 4/1998 | Skaggs | ............ 408/97 |
| 5,746,551 A | * | 5/1998 | Skaggs | ............ 408/1 R |
| 6,511,266 B1 | * | 1/2003 | Groot | ............ 408/1 R |

FOREIGN PATENT DOCUMENTS

| | | |
|---|---|---|
| WO | 94/06591 A | 3/1994 |
| WO | 99/28072 A1 | 6/1999 |

\* cited by examiner

Primary Examiner—Daniel W. Howell
(74) Attorney, Agent, or Firm—Nixon & Vanderhye P.C.

(57) ABSTRACT

A drill tool comprises a drive shaft (2) that is arranged to allow rotational movement to be transmitted from a drill to a drill bit holder (10) even when the opposite ends of the drive shaft are not axially aligned. The end of the drive shaft housing the drill bit holder (10) can be inserted into a guide member (14) that includes a planar element (18, 42) that is arranged to ensure that the drill bit is maintained at substantially 90° to the surface of a work piece being drilled even if the drill itself is not so aligned.

11 Claims, 1 Drawing Sheet

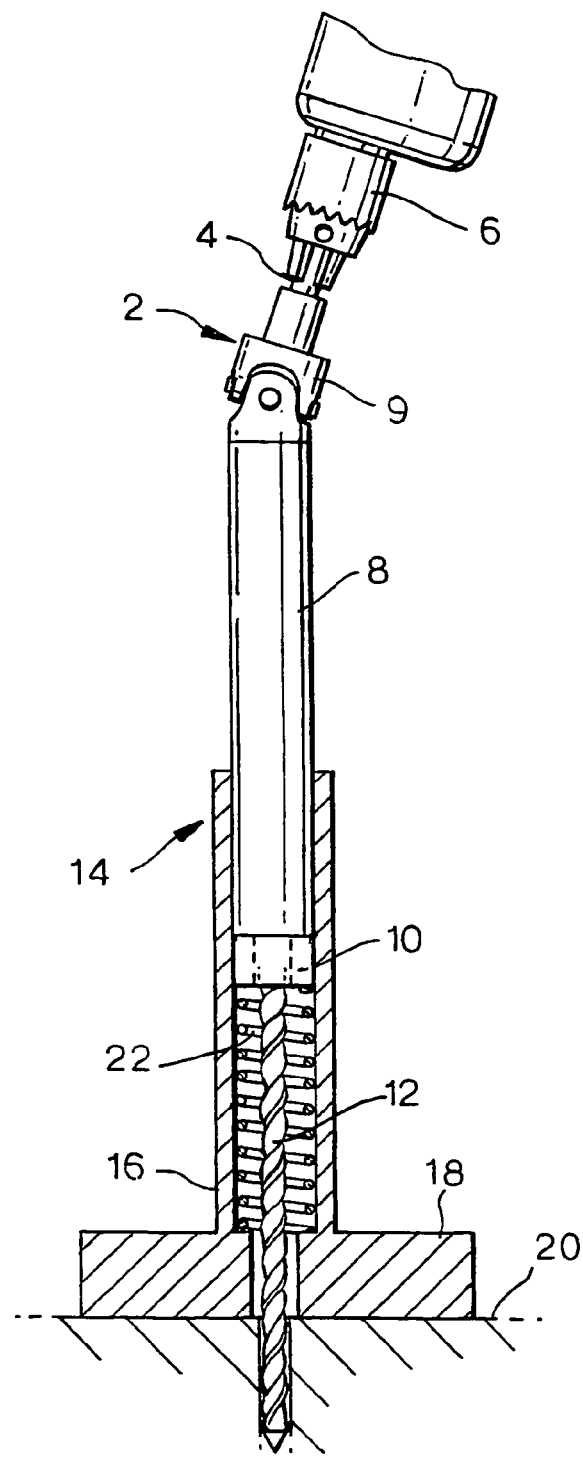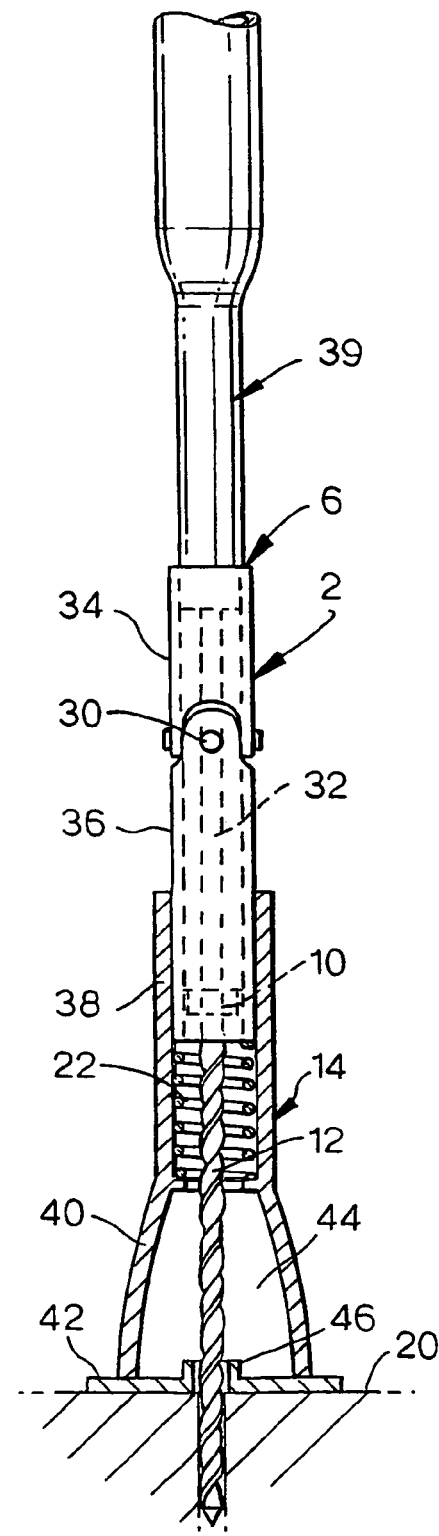

DRILL TOOL

This application is the US national phase of international application PCT/GB02/03281 filed in English 18 Jul. 2002, which designated the U.S. PCT/GB02/03281 claims priority to GB Application No. 0123112.5, filed 26 Sep. 2001. The entire contents of these applications are incorporated herein by reference.

The present invention relates to a drill tool that facilitates the drilling of a hole which is normal to a surface with the drill held at an angle to the drill bit.

In many applications, for example within the aerospace industry, there is a requirement to drill holes within a work piece at substantially 90°, or normal, to the work piece surface. The requirement that the drilled hole be normal to the surface of the work piece is important to ensure the accuracy of the fit between the work piece and a further element. Ordinarily the required accuracy can be achieved either manually by skilled operators, or by securing the work piece in a fixed relationship to the drilling apparatus used to drill the hole.

However, there are situations where it is not possible to fix the work piece with respect to the drill in such a fixed relationship, for example when the surface to be drilled is located at a difficult to reach position such that it is difficult or impossible to orientate the entirety of the drilling apparatus correctly with respect to the work piece. Such a scenario is often encountered when the holes are required to be drilled in an already assembled work piece for the purposes of making a repair or retrofitting further equipment.

In such cases it is either difficult to reach the desired location for the drilled hole easily or is difficult to hold the drilling apparatus normal to the work piece surface. This can result in the holes being drilled either at the wrong location, or more likely, at the incorrect angle to the work piece surface.

A solution to the problem of ensuring the normality of the drilling apparatus to the work piece surface is presented in U.S. Pat. No. 5,848,859. This document discloses a drilling device that includes an automatic control arm carrying a compliant drill head which comprises a drill housing and a pressure foot that, in use, contacts the work surface. The pressure foot is connected to the drill housing at a universal swivelling joint. Linear gauges mounted to the drill housing detect the orientation of the pressure foot relative to the drill housing and provide data to the automatic control arm that can realign the drill housing with the pressure foot so that the drill axis is normal to the work piece surface. However, this device is not suitable for hand held operation and, due to its relatively large size, cannot be used in difficult-to-reach locations. Furthermore, the device operates in such a manner that it always brings the drill housing into alignment with the pressure foot.

According to a first aspect of the present invention there is provided a drill tool comprising: a drive shaft arranged to transmit rotational motion when opposing first and second ends of said drive shaft are not axially aligned; and a guide element arranged, in use, to hold the first end of the drive shaft in a predetermined spatial relationship to a work piece to be drilled.

Preferably a drill bit holder is coupled to said first end of said drive shaft.

Preferably the drive shaft comprises a flexible shaft that transmits the rotational motion, the flexible shaft being connected to the drill bit holder. Additionally, the flexible drive shaft may be enclosed by first and second drive shaft casing elements, the casing elements being connected to one another by a flexible joint. Preferably, the flexible joint comprises a universal joint.

Preferably the drill bit holder is rotatably mounted within the first drive shaft casing element. Additionally, the drill bit holder may be linearly restrained within the first drive shaft casing element.

Alternatively, the drive shaft may comprise first and second shaft portions connected to one another by a joint that has 3 axis of movement, such as a universal joint. In this case, the drill bit holder is rigidly connected to one of the shaft portions.

Additionally, the guide element comprises a first portion having a hollow passage therein arranged to receive the first end of the drive shaft or the second drive shaft casing element and a substantially planar element connected to the first portion at a predetermined angle. Preferably the predetermined angle is substantially 90°.

Additionally, the planar element includes a bore formed therethrough that is axially aligned with the hollow passage of the first portion.

Preferably the hollow passage of the first portion of the guide element has substantially the same cross section as that of the first end of the drive shaft, or of the second drive shaft casing element.

Additionally, a guide bush may be located within the bore of the planar element, the guide bush being arranged to allow the passage of a drill bit therethrough.

Preferably the guide element includes at least one aperture through which swarf may be evacuated when said drill tool is in use. This prevents the guide bush and the hollow passage of the first portion of the guide element becoming blocked by swarf during use of the drill tool.

Additionally, the guide element may further include a resilient biasing member arranged to urge the first end of the drive shaft away from the work piece to be drilled. Preferably, the resilient biasing member comprises a helical spring.

Additionally, a restraining member may be provided on either the guide element or the first end of the drive shaft to prevent the first end of the drive shaft becoming completely disengaged from the guide element.

Embodiments of the present invention are described, by way of example, with reference to the accompanying figures, in which:

FIG. 1 shows a first embodiment of the present invention; and

FIG. 2 shows a second embodiment of the present invention.

A first embodiment of the present invention is shown in FIG. 1. A drive shaft 2 comprises a first portion 4 that is arranged to be gripped by the jaws of a chuck 6 of a conventional drill. A second portion 8 is connected to the first portion 4 by a universal joint 9. The universal joint allows the first and second portions 4 and 8 to be driven in rotation by the drill chuck 6 when the two portions are at an angle relative to one another. A drill bit holder 10, such as a collet, is located at the end of the second portion 8 distal from the universal joint. The drill bit holder removably holds a drill bit 12 used to form a hole. A drill guide 14 is further provided that itself comprises a first substantially tubular portion 16 connected to a substantially planar element 18 that in use contacts the surface 20 of the work piece. The planar element 18 has a substantially central bore located therein through which the drill bit 12 can pass. The tubular portion 16 is dimensioned so as to be a close fit with the second portion 8 of the drive shaft 2 such that the drive shaft may freely rotate within the drill guide 14 but the second element 8 is maintained at substantially 90° to the surface 20 of the work piece by virtue of the action of the drill guide 14. A spring 22 may be located within the drill guide 14 between the planar element 18 and the free end of the second portion 8 to the drive shaft 2. The sense of rotation of the helix of the spring is selected such that the ends of the spring can slide with respect to the collet and the planar element 18.

Although this embodiment of the present invention allows a substantially normal hole to be drilled within a work piece whilst the drill device itself may be held at an angle to the work piece, some less than desirable characteristics are present. As the second element 8 of the drive shaft 2 itself rotates within the guide element 14, which is in a close fitting relationship with the second element 8 of the drive shaft 2, the guide element 14 also tends to rotate unless manually restrained. Such rotation may cause unwanted disfiguring of the surface of the work piece around the drilled hole. Also, when the universal joint 10 of the drive shaft 2 is at an angle the speed of rotation of the second portion 8 of the drive shaft, and therefore the drill bit 12, tends to oscillate in angular velocity.

A further embodiment of the present invention is shown in FIG. 2 offers an improvement over the arrangement shown in FIG. 1. Unless otherwise stated, like reference numerals in FIGS. 1 and 2 refer to the same parts. A flexible drive shaft 32 runs inside of first and second drive shaft casings, numbered 34 and 36 respectively, connected by a universal joint 30. The first drive shaft casing 34 is arranged to be rigidly attached to the body of a drill mechanism 38 in such a way that it does not rotate when the drill mechanism 38 is in operation. The flexible shaft 32 is arranged to pass substantially along the central axis of the first and second drive shaft casings and the universal joint 30 and is free to bend to accommodate non-axial alignment. One end of the flexible shaft 32 is arranged to be connected to the chuck 6 of the drill mechanism 38, such that rotation of the drill mechanism in use is transmitted to the flexible shaft 32. The flexible shaft is of such a construction that the speed of rotation of the shaft over its whole length remains constant even when the two ends of the shaft are at an angle with respect to each other. The second drive shaft casing 36 includes a collet 10 that is free to rotate with respect to the casing 36 and that is connected to the second end of the flexible shaft 32. The collet 10 is linearly restrained within the second drive shaft casing 36.

A guide element 14 that, in use, is placed on the surface 20 of the work piece has a tubular portion 38 defining a hollow passage that is of the same cross-section as the second drive shaft casing 36. The second drive shaft casing 36 is therefore free to slide linearly along the axis of the tubular portion 38 of the guide element 14. However, it will be appreciated that as the universal joint 30 does not rotate when the drill mechanism 39 is in operation, then no rotational force is applied to the guide element 14. Although a circular cross-section is preferred for ease of manufacture and use, it will be appreciated that because the second drive shaft casing 36 does not rotate any cross-section may be adopted.

Extending from the tubular portion passage 38 of the guide element 14 are one or more support elements 40 that support a substantially planar element 42 arranged at substantially 90° to the axis of the guide element 14. The planar element 42, in use being placed on the surface 20 of the work piece. The at least one support element 40 defines a cavity 44 into which swarf is evacuated through a guide bush 46 located at the central point of the planar element 42 and through which the drill bit 12 passes. In a variation, the support element 40 may have holes formed in the sides thereof such that swarf can be removed or may exit from the cavity 44.

It will be appreciated that since the guide element does not rotate, modified versions may be manufactured where the planar element 42 is not perpendicular to the axis of the guide element, thereby allowing for accuracy defined inclined holes to be drilled.

As in the embodiment shown in FIG. 1, a spring 22 may be provided within the hollow passage defined by tubular portion 38 of the guide 14 to bias the drill bit away from the work piece 20. Because the rotational drive to the drill bit 12 is carried separately from the drive shaft casings by the flexible shaft 32, as opposed to by the casings and universal joint themselves, no rotational forces are transmitted to the guide element 14, which therefore remains stationary on the surface 20 of the work piece when the drill mechanism 39 is in operation. This allows the embodiment of the present invention shown in FIG. 2 to be used single handedly as it is not necessary to manually prevent rotation of the guide mechanism 14. This therefore further improves the ease of use of this embodiment, particularly in difficult to access locations.

However, it will be appreciated that both above described embodiments of the present invention provide a significant improvement over the known prior art with regards to providing a drill bit mechanism that allows holes to be drilled in a work piece at substantially 90° to the surface of the work piece in a reliable and convenient manner.

The invention claimed is:

1. A hand held drill tool comprising:
    a flexible drive shaft arranged to transmit rotational motion when opposing first and second ends of said drive shaft are not axially aligned; and
    a guide element arranged, in use, to hold the said first end of the flexible drive shaft in a predetermined spatial relationship to a work piece to be drilled, the first end of the flexible drive shaft being connected to a drill bit holder, at the first end thereof; and
    first and second drive shaft casing elements, said casing elements connected in series to each other by means of a flexible joint and substantially enclosing different portions of said flexible drive shaft.

2. A drill tool according to claim 1, wherein said guide element further includes a resilient biasing member arranged to urge said first end of said drive shaft away from said work piece to be drilled.

3. A drill tool according to claim 1, wherein said drill bit holder is rotatably mounted within said second drive shaft casing element.

4. A drill tool according to claim 1, wherein said guide element comprises a first portion having a hollow passage therein arranged to receive said second drive shaft casing element, and a substantially planar element connected to said first portion so as to be substantially perpendicular thereto.

5. A drill tool according to claim 1, wherein said drive shaft comprises first and second shaft portions connected to one another by a universal type joint.

6. A drill tool according to claim 1, wherein said guide element comprises a first portion having a hollow passage therein arranged to receive said first end of said drive shaft and a substantially planar element connected to said first portion so as to be substantially perpendicular thereto.

7. A drill tool according to claim 4 wherein said planar element includes a bore formed therethrough axially aligned with said hollow passage of said first portion.

8. A drill tool comprising:
   a flexible drive shaft arranged to transmit rotational motion when opposing first and second ends of said drive shaft are not axially aligned; and
   a guide element arranged, in use, to hold the said first end of the flexible drive shaft in a predetermined spatial relationship to a work piece to be drilled, the first end of the flexible drive shaft being connected to a drill bit holder, at the first end thereof, further comprising first and second drive shaft casing elements, said casing elements being connected to one another by a flexible joint, and substantially enclosing said flexible shaft, wherein said guide element comprises a first portion having a hollow passage therein arranged to receive said second drive shaft casing element, and a substantially planar element connected to said first portion so as to be substantially perpendicular thereto, wherein said planar element includes a bore formed therethrough axially aligned with said hollow passage of said first portion, wherein a guide bush is located within said bore of said planar element, said guide bush being arranged to allow the passage of a drill bit therethrough.

9. A drill tool according to claim 1, wherein said guide element includes at least one aperture through which swarf may be evacuated when said drill tool is in use.

10. A drill tool comprising:
   a flexible drive shaft arranged to transmit rotational motion when opposing first and second ends of said drive shaft are not axially aligned; and
   a guide element arranged, in use, to hold the said first end of the flexible drive shaft in a predetermined spatial relationship to a work piece to be drilled, the first end of the flexible drive shaft being connected to a drill bit holder, at the first end thereof, wherein said guide element further includes a resilient biasing member arranged to urge said first end of said drive shaft away from said work piece to be drilled.

11. A drill tool according to claim 7, wherein a guide bush is located within said bore of said planar element, said guide bush being arranged to allow the passage of a drill bit therethrough.

* * * * *